UNITED STATES PATENT OFFICE.

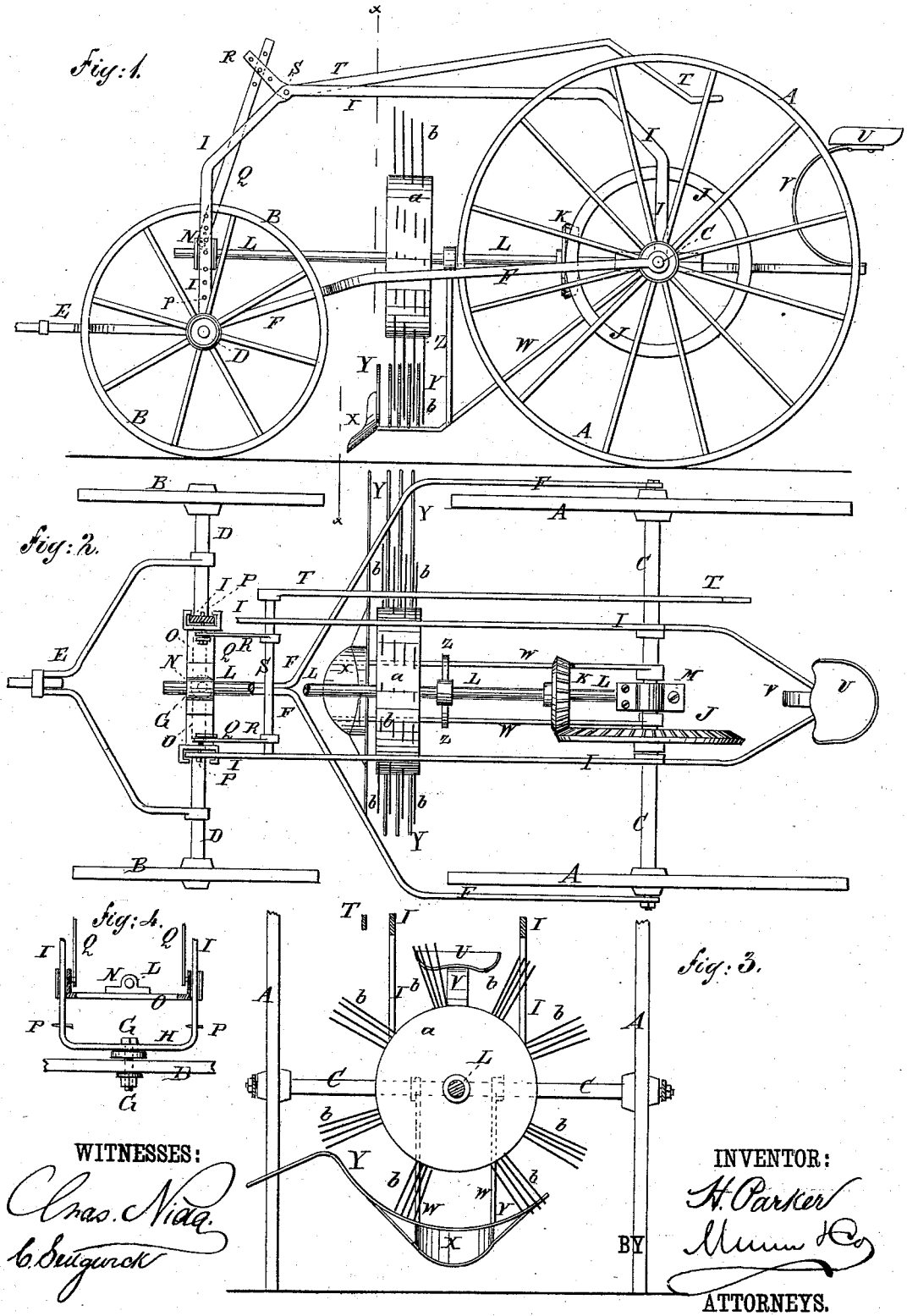

HENRY PARKER, OF GANANOQUE, ONTARIO, CANADA.

POTATO-DIGGER.

SPECIFICATION forming part of Letters Patent No. 239,536, dated March 29, 1881.

Application filed October 23, 1880. (Model.)

*To all whom it may concern:*

Be it known that I, HENRY PARKER, of Gananoque, in the Province of Ontario and Dominion of Canada, have invented a new and useful Improvement in Potato-Diggers, of which the following is a specification.

Figure 1 is a side elevation of the improvement. Fig. 2 is a plan view. Fig. 3 is a sectional end elevation taken through the line *x x* of Fig. 1. Fig. 4 is a front elevation, partly in section, of the mechanism for supporting the forward end of the driving-shaft.

The object of this invention is to furnish potato-diggers so constructed as to raise the potatoes and soil from the ground, separate them, and deposit the potatoes upon the top of the ground at the side of the diggers; and to this end my invention consists in a carriage adapted to receive the operating mechanism, the mechanism for raising the potatoes and soil from the ground, and the mechanism for separating the potatoes from the soil and delivering them upon the ground at the side of the machine, all constructed and arranged as hereinafter fully described, and pointed out in the claims.

A represents the rear wheels; B, the forward wheels; C, the rear axle; D, the forward axle, and E the tongue.

F are two bars, the rear ends of which are secured to the ends of the rear axle, C. The bars F, in the rear of the forward wheels, B, are bent inward and then forward, and their forward ends are pivoted to the king-bolt G, that passes through the center of the forward axle, D. The king-bolt G also passes through the center of the bar or bolster H, to the ends of which are attached, or upon them are formed, the ends of two bars, I. The bars I pass up vertically, are bent to the rearward, pass back horizontally, are bent downward, and their ends are provided with bearings, in which the rear axle, C, revolves.

To the rear axle, C, is attached a large beveled-gear wheel, J, the teeth of which mesh into the teeth of a smaller beveled-gear wheel, K, attached to the shaft L, so that the said shaft L will be revolved by the advance of the machine. The rear end of the shaft L revolves in a bearing, M, placed upon the rear axle, C, and in which the said axle C also revolves. The forward end of the shaft L revolves in a bearing, N, attached to the center of a bar or yoke, O, the ends of which, or keepers or guides attached to the said ends, slide up and down upon the lower forward parts of the bars I. The downward movement of the bar O, and consequently of the forward end of the shaft L, is limited by pins P, passed through holes in the bars I below the ends of the said bar O. Several holes are formed in the bars I to receive the pins P, to limit the depth to which the machine can enter the ground.

To the end parts of the bar O are attached the lower ends of two bars, Q, the upper ends of which are hinged to the ends of the arms R, rigidly attached to the short shaft S. Several holes are formed in the bars Q and arms R, to receive the pivoting-pins, so that the throw of the bars Q may be increased or lessened, as may be required. The shaft S is pivoted to the upper forward part of the bars I, and to the said shaft is rigidly attached the forward end of the lever T, which extends back into such a position that it can be conveniently reached and operated by the driver from his seat U. The driver's seat U is attached to the upper end of a standard, V, the lower end of which is attached to a rearward extension of the bars I, or to some other suitable support.

With the rear axle, C, upon the opposite sides of and equally distant from its center, are connected the rear ends of two bars, W, which incline downward, and to their forward ends is attached the scoop X, which passes beneath and raises the soil and potatoes of the hills. The parts of the bars W directly in the rear of the scoop X are horizontal, or nearly so, and to them is attached a series of parallel bars, Y, which bars are placed at right angles with the length of the machine, and are curved, as shown in Fig. 3. The bars Y, at one side of the machine, are curved downward to discharge the potatoes outside the path of the machine.

To the bars W, at the rear side of the curved cross-bars Y, are attached the lower ends of the bars Z, the upper ends of which have a bearing attached to or formed upon them to receive the shaft L, so that the bars W, scoop X, and curved cross-bars Y will be suspended from the shaft L, and will be raised and lowered by raising and lowering the forward end of the said shaft L.

To the shaft L, directly above the curved cross-bars Y, is attached a hub or drum, a, to which are attached diagonally or spirally arranged rows of fingers b. The fingers b are so placed as to pass between the bars Y as the separating-wheel is carried around by the revolution of the shaft L.

With this construction, as the machine is drawn forward the scoop X raises the potatoes and soil and delivers them upon the curved cross-bars Y. At the same time the revolution of the shaft L and hub a causes the fingers b to sweep through the spaces between the curved bars Y, causing the soil to drop through the said spaces to the ground, and carrying the potatoes to the downwardly-inclined projecting parts of the said curved bars Y, down which they roll to the ground at the side of the path of the machine.

Having thus described my invention, I claim as new and desire to secure by Letters Patent—

1. In a potato-digger, the combination, with the wheels A B and axles C D, of the bars H, I, and F, substantially as herein shown and described, to form a carriage adapted to receive the operating mechanism, as set forth.

2. In a potato-digger, the combination, with the axle C and the shaft L, of the supporting-bars W Z, the scoop X, and the parallel curved cross-bars Y, substantially as herein shown and described, whereby the potatoes and soil are raised from the ground, as set forth.

3. In a potato-digger, the combination, with the axles C D, the supporting-bars H I, the scoop X, and the curved parallel bars Y, of the gear-wheels J K, the shaft L, the hub a, and the rows of fingers b, substantially as herein shown and described, whereby the potatoes are separated from the soil and are delivered upon the ground at the side of the machine, as set forth.

HENRY PARKER.

Witnesses:
GEORGE GILLIES,
DAVID BEWS.